United States Patent Office 2,790,723
Patented Apr. 30, 1957

2,790,723

HIGH-INDEX GLASS ELEMENTS

Norman H. Stradley, St. Paul, and Warren R. Beck, Mahtomedi, Minn., assignors to Minnesota Mining & Manufacturing Company, St. Paul, Minn., a corporation of Delaware No Drawing. Application August 12, 1953, Serial No. 373,906

6 Claims. (Cl. 106—47)

This invention relates to transparent high-index glass elements, such as glass beads, fibers, flakes and thin plates, as new and useful articles of manufacture. These glass elements have a thickness not exceeding approximately two millimeters and have extraordinarily high refractive indices (2.1 to 2.4). They have high optical dispersion values and high dielectric constants. They are chemically stable and stable to sunlight and to exposure to humid atmospheres, and are not damaged by immersion in water. They can be made so as to be substantially colorless, or they can be colored, if desired, by inclusion of suitable color-imparting metal compounds or other agents.

We utilize novel glass compositions having a high content of titanium dioxide (20–50%) with the balance being entirely or mainly lead oxide (10–65%) and barium oxide (or equivalent oxide, or zinc oxide or cadmium oxide), as more fully described hereafter.

Our invention provides clear transparent high-index glass beads of good stability and good optical quality, adapted for use as sphere-lens optical elements in the manufacture of reflex-reflecting products of the type described in U. S. Patent No. 2,407,680 (Sept. 17, 1946). Glass beads for this usage have a diameter which may range from less than 1 mil up to about 10 mils. The reflector products are used in making highway and vehicle signs and markers which are exposed outdoors to sunlight over a period of many months; hence the beads must be non-solarizing, that is, must not darken to an objectionable extent when exposed out of doors for extended periods. The beads must be formed from glass compositions which melt to a free-flowing state, since the molten particles of glass must form themselves into true spheres due to the surface tension effect operating during the available time interval in the manufacturing process. The beads should be homogeneous and transparent, and have a nearly perfect sphericity, in order to function properly as sphere-lenses. We have achieved these objectives with our novel glass compositions which provide beads having refractive indices in the desired range of 2.1 and higher.

The beads can be made by fusing particles of glass cullet which are blown or dropped through a high temperature flame or a radiant heating zone to soften them sufficiently to form transparent spheres by the action of surface tension while moving through air followed by rapid cooling to harden the spheres without devitrification taking place. The cullet can be made by quenching a stream of molten glass in water. The beads can also be made directly from a batch of molten glass.

The small size of the beads can be appreciated from the fact that there are billions in a mass thereof occupying a cubic foot of volume, and that a layer of beads contains many thousands per square inch.

Fibers can be made by jet-blowing a stream of molten glass. Filaments can be drawn from molten glass through a die, followed by rapid cooling. Thin plates and flakes of glass can be made by casting a thin layer of molten glass on a cold steel surface. Many of our glasses have been tested in the form of thin plates and have been found to have dielectric constants up to about 60, indicating suitability for use as dielectric elements of capacitors, etc. Small jewelry "gems" can be made from pieces of our glass. The high refractive index and high optical dispersion results in high surface sparkle and high internal light reflection.

Our glasses lie outside the field of optical glasses as ordinarily conceived. Our glass beads are not made from true optical glasses but from novel compositions which would not be regarded as "optical glasses" by glass technologists since they cannot be used for the purposes which a glass technologist has in mind when he uses the term "optical glass" (namely, glasses useful for making high quality lenses and prisms for optical instruments such as cameras, projectors, microscopes, telescopes, periscopes, binoculars, spectacles, etc.). The manufacture of glass elements for such optical instruments generally requires the making of glass blanks of substantial size and thickness. The necessary pieces of solid glass must be formed from molten glass without divitrification taking place during the cooling of the glass. The larger the piece of glass, the slower the cooling that is required to avoid excessive mechanical and optical strains. The slower the cooling, the greater the tendency to devitrify. Hence glass formulations must be employed which will not result in devitrification in making the sizable pieces of glass that are to be finished in manufacturing the final optical elements, such as lenses and prisms.

Our glass compositions are of such a nature that they cannot be employed in making optical elements of the usual sizes and shapes. They have a strong devitrification tendency owing to the high proportion of titanium dioxide, and to the necessity of avoiding expedients that would lower the refractive index below the desired value. We have discovered, however, that these compositions can be employed in making commercially useful elements provided these elements have a thickness not exceeding approximately two millimeters. These elements are sufficiently thin to permit of rapid cooling or quenching of the hot glass so that they can be brought to room temperature without devitrifying.

Transparent, stable and useful glasses of the published prior art, having recognized commercial optical interest, have not exceeded a refractive index of approximately 2.0, and only rare and unusual glasses have exceeded a value of 1.8. The commonly used optical glasses of the so-called "high-index" types have not materially exceeded a refractive index value of 1.7. Our discoveries have involved the devising and study of unorthodox glass systems whose practical utility for our purpose was unpredictable, since it does not suffice to provide the desired refractive index if the glass composition cannot be usefully employed in making transparent stable glass beads of suitable quality and cost.

The glass compositions which we employ may be generically defined as being those having refractive index ($n_D$) values of at least 2.1 and essentially consisting of metal oxide combinations designated in the following table, proportions being in percentage by weight:

| | |
|---|---|
| $TiO_2$ | 20–50 |
| $PbO$ | 10–65 |
| BaO Group | 0–45 |
| $ZnO$ | 0–10 |
| $CdO$ | 0–20 |
| $Bi_2O_3$ | 0–5 |
| $PbO+ZnO+BaO$ Group | 35–80 |
| $CdO+ZnO+BaO$ Group | 5–45 |
| $PbO+CdO+Bi_2O_3$ | 10–70 |

The term "BaO Group" is used to designate alkaline earth metal oxides of the group consisting of barium oxide (BaO), strontium oxide (SrO), calcium oxide (CaO), and magnesium oxide (MgO). Barium oxide is the preferred constituent of this group.

However, we can omit all members of this group and instead use up to 10% of zinc oxide (ZnO) or up to 20% of cadmium oxide (CdO) or combinations thereof; and we can use one or more oxides of the "BaO Group" in combination with ZnO or CdO. Zinc and cadmium oxides are employed for increasing the refractive index. These various possibilities are indicated in the above table. At least one oxide of the "BaO Group," or ZnO, or CdO, must be present in order to comply with the stated condition that there be a total amount in the range of 5 to 45%.

It is apparent from the table that when both the "BaO Group" and ZnO are not used, the proportion of lead oxide (PbO) must be in the range of 35 to 65%, in order to satisfy the condition that the PbO content not exceed 65% and the further condition that the total of PbO plus ZnO plus "BaO Group" be 35–80% (since in this case the proportions of "BaO Group" and ZnO are 0%).

Bismuth oxide ($Bi_2O_3$) is an optional modifying ingredient that can be used in small portion (up to 5%) to boost the refractive index, but it is not used in our preferred compositions.

In any event, the total amount of bismuth and cadmium oxides (when either or both is used) should be balanced in relation to the amount of lead oxide employed; hence the condition that the total of PbO plus CdO plus $Bi_2O_3$ be in the range of 10 to 70%. This means that when the lead oxide proportion has the maximum value of 65%, the total amount of bismuth and cadmium oxides should not exceed 5%; but they may be used in greater proportion when a smaller proportion of lead oxide is used.

We have found that small amounts of the so-called strong glass-forming oxides may be included as optional modifying agents, having the desirable property of improving meltability, homogeneity and vitreosity, without preventing the obtaining of refractive indices above 2.1 and other desired properties. The fact that these oxides can be omitted is a distinguishing characteristic of our primary composition that demonstrates a qualitative difference from compositions that require a relatively large proportion of strong glass-forming oxide. By strong glass-forming oxides, reference is made to boric oxide ($B_2O_3$), silicon dioxide ($SiO_2$), phosphorous pentoxide ($P_2O_5$) and germanium oxide ($GeO_2$). The total amount of these oxides (when used) should not exceed 10%, and the amount of $B_2O_3$ preferably should not exceed 3%.

Our glasses are further characterized by the absence in any substantial amount of the oxides of alkali metals, which are preferably entirely absent and in no event should total more than 5%.

The presence as modifying agents of small amounts of other metal oxides known to be useful in glass compositions is not precluded when suitable in the particular composition in which incorporated; such as tungsten oxide ($WO_3$), zirconium oxide ($ZrO_2$), thorium oxide ($ThO_2$), cerium oxide ($Ce_2O_3$), vanadium oxide ($V_2O_3$), thallium oxide ($Tl_2O_3$), lanthanum oxide ($La_2O_3$), etc. Elements such as arsenic and antimony cause rapid solarization, i. e., a darkening or change of color on exposure of the glass to sunlight, and are in general to be avoided.

In accord with general practice, our glass compositions are reported in terms of percentage by weight of oxide components presumptively present based on proportions of the oxide-forming elements known to be present in the batch or determined by analysis. It will be recognized that compounds other than oxides can be added in compounding the original glass-making charge, in amounts calculated to provide the desired amount of oxide. For example, litharge, red lead, lead nitrate, etc., may be used to provide the PbO component; and $BaCO_3$, $H_3BO_3$, $SrCO_3$, $MgCO_3$, $CaCO_3$, $CdCO_3$ may be used to provide BaO, $B_2O_3$, SrO, MgO, CaO and CdO, respectively. Ordinarily, $TiO_2$, $SiO_2$, $P_2O_5$ and ZnO will be incorporated as such.

In making the present glasses, the batch in powdered form (including cullet from previous runs when available) is mixed uniformly and melted in an alumina vessel. The melting temperature is in the range of 1200 to 1400° C.

Our preferred glasses may be referred to as being of the $TiO_2$–PbO–BaO type and, consistent with the limitations previously stated, contain approximately 25 to 45% $TiO_2$, 15 to 55% PbO, 5 to 35% BaO, 1 to 8% ZnO, and 1 to 6% (total) of one or more strong glass-forming oxides ($B_2O_3$, $SiO_2$, $P_2O_5$ and $GeO_2$), proportioned such that the total of PbO, BaO and ZnO is at least approximately 50%; the glasses consisting substantially entirely of these oxides and having refractive indices of at least 2.15.

The following are preferred formulas, the first of which (A) has been utilized on a large commercial scale in the manufacture of glass beads for reflex-reflector products. Proportions are in percent by weight.

|  | (A) | (B) | (C) |
|---|---|---|---|
| $TiO_2$ | 33.0 | 27.3 | 40.8 |
| PbO | 47.0 | 56.4 | 22.8 |
| BaO | 12.9 | 5.2 | 32.4 |
| ZnO | 4.1 | 6.1 | 1.5 |
| $B_2O_3$ | 3.0 | 0.8 | 2.5 |
| $P_2O_5$ |  | 1.0 |  |
| $SiO_2$ |  | 3.2 |  |
| Total | 100.0 | 100.0 | 100.0 |

The following equivalent table shows the proportions on a mole percent basis:

|  | (A) | (B) | (C) |
|---|---|---|---|
| $TiO_2$ | 49.0 | 43.3 | 55.5 |
| PbO | 25.0 | 31.8 | 11.2 |
| BaO | 10.0 | 4.2 | 23.2 |
| ZnO | 6.0 | 9.4 | 2.0 |
| $BO_{1.5}$ | 10.0 | 2.8 | 8.1 |
| $PO_{2.5}$ |  | 1.8 |  |
| $SiO_2$ |  | 6.7 |  |
| Total | 100.0 | 100.0 | 100.0 |

The glasses of these formulas have the following physical properties:

|  | (A) | (B) | (C) |
|---|---|---|---|
| Refractive index ($n_D$) | 2.26 | 2.26 | 2.15 |
| Density | 5.5 | 5.8 | 4.9 |
| Dielectric constant | 60 |  | 42 |
| Solidus temperature (°C) | 980 |  | 980 |
| Annealing temperature (°C) | 555 |  | 580 |
| Liquidus temperature (°C) | 1,250 | 1,170 | 1,290 |

The above temperature values are approximate but are sufficiently accurate average values to indicate the order of magnitude.

A suitable batch formulation for making formula (A) is one composed of 31.3% titanium dioxide, 44.8% red lead, 15.3% barium carbonate, 3.8% zinc oxide, and 4.8% boric acid, by weight.

The invention is further illustrated by the exemplary glass compositions set forth in the following tables, all of which have been used in making useful transparent glass beads having refractive indices of at least 2.1, the respective values being given in the tables.

Table I

| No. | Percentage Composition by Weight | | | | | | | Refractive Index |
|---|---|---|---|---|---|---|---|---|
| | $TiO_2$ | PbO | BaO | $B_2O_3$ | $SiO_2$ | $P_2O_5$ | $GeO_2$ | |
| 1 | 47.0 | 10.0 | 43.0 | | | | | 2.10 |
| 2 | 45.0 | 15.0 | 40.0 | | | | | 2.11 |
| 3 | 43.3 | 21.2 | 35.5 | | | | | 2.12 |
| 4 | 32.2 | 42.4 | 25.4 | | | | | 2.18 |
| 5 | 21.9 | 65.2 | 12.9 | | | | | 2.24 |
| 6 | 27.1 | 47.4 | 15.7 | | 9.8 | | | 2.12 |
| 7 | 27.8 | 49.5 | 16.5 | | | 6.2 | | 2.19 |
| 8 | 30.0 | 45.0 | 19.0 | | | | 6.0 | 2.20 |
| 9 | 40.0 | 22.5 | 35.0 | 2.5 | | | | 2.13 |
| 10 | 21.7 | 51.9 | 17.3 | | 2.7 | 6.4 | | 2.12 |
| 11 | 27.7 | 48.6 | 16.2 | 1.4 | | 6.1 | | 2.15 |
| 12 | 27.0 | 47.9 | 16.1 | 2.4 | 5.1 | 1.5 | | 2.15 |

Table II

| | Percentage Composition by Weight | | | | | | | |
|---|---|---|---|---|---|---|---|---|
| No | 13 | 14 | 15 | 16 | 17 | 18 | 19 | 20 |
| $TiO_2$ | 26.5 | 29.4 | 28.8 | 27.9 | 41.9 | 40.8 | 27.3 | 45.0 |
| PbO | 55.0 | 61.0 | 60.0 | 58.0 | 23.5 | 22.8 | 56.4 | 10.0 |
| BaO | 10.6 | | | 1.4 | 12.0 | 32.4 | 5.2 | 40.0 |
| SrO | 3.1 | | | | | | | |
| CaO | | | 6.0 | | | | | |
| MgO | | 4.4 | | | | | | |
| ZnO | | | | 7.7 | | 1.5 | 6.1 | |
| CdO | | | | | 20.0 | | | |
| $Bi_2O_3$ | | | | | | | | 5.0 |
| $B_2O_3$ | | | | | 2.6 | 2.5 | 0.8 | |
| $SiO_2$ | 3.4 | 3.7 | 3.7 | 3.6 | | | 3.2 | |
| $P_2O_5$ | 1.4 | 1.5 | 1.5 | 1.4 | | | 1.0 | |
| Ref. Ind | 2.15 | 2.24 | 2.19 | 2.28 | 2.23 | 2.15 | 2.26 | 2.13 |

Table III

| | Percentage Composition by Weight | | | | | | | |
|---|---|---|---|---|---|---|---|---|
| No | 21 | 22 | 23 | 24 | 25 | 26 | 27 | 28 |
| $TiO_2$ | 34.0 | 35.0 | 45.0 | 28.0 | 45.0 | 49.2 | 29.0 | 30.0 |
| PbO | 35.0 | 42.0 | 10.0 | 57.0 | 15.0 | 10.4 | 48.0 | 45.0 |
| BaO | | | 23.0 | | 31.0 | 34.9 | | |
| ZnO | | | | 10.0 | 8.0 | 5.5 | | |
| CdO | 20.0 | 18.0 | 20.0 | | | | 18.0 | 20.0 |
| $Bi_2O_3$ | 5.0 | | | | | | 4.0 | 5.0 |
| $B_2O_3$ | 3.0 | 1.0 | 2.0 | 2.5 | 1.0 | | 1.0 | |
| $SiO_2$ | 3.0 | 4.0 | | 2.5 | | | | |
| Ref. Ind | 2.23 | 2.26 | 2.17 | 2.22 | 2.15 | 2.15 | 2.34 | 2.36 |

We claim:

1. Transparent glass beads having a diameter not exceeding 10 mils, formed from glass characterized by having a refractive index of at least 2.1 and essentially consisting of a metal oxide combination meeting the composition requirements of the following table wherein proportions are in percent by weight:

| | |
|---|---|
| $TiO_2$ | 20–50 |
| PbO | 10–65 |
| BaO Group | 0–45 |
| ZnO | 0–10 |
| CdO | 0–20 |
| $Bi_2O_3$ | 0–5 |
| PbO+ZnO+BaO Group | 35–80 |
| CdO+ZnO+BaO Group | 5–45 |
| PbO+CdO+$Bi_2O_3$ | 10–70 | said "BaO Group" signifying metal oxides of the class consisting of BaO, SrO, CaO and MgO.

2. Glass beads according to claim 1 wherein the glass contains at least one oxide selected from the group consisting of $B_2O_3$, $SiO_2$, $P_2O_5$ and $GeO_2$, the total amount of these oxides not exceeding 10% by weight.

3. Transparent glass beads having a diameter not exceeding 10 mils, formed from glass characterized by having a refractive index of at least 2.15 and substantially entirely consisting of 25 to 45% $TiO_2$, 15 to 55% PbO, 5 to 35% BaO, 1 to 8% ZnO, and at least one oxide selected from the group consisting of $B_2O_3$, $SiO_2$, $P_2O_5$ and $GeO_2$, the total amount thereof being 1 to 6%, and the total amount of PbO, BaO and ZnO being at least 50%, by weight.

4. As a new article of manufacture, a transparent glass element having a thickness not exceeding two millimeters, formed from glass characterized by having a refractive index of at least 2.1 and essentially consisting of a metal oxide combination meeting the composition requirements of the following table wherein proportions are in percent by weight:

| | |
|---|---|
| $TiO_2$ | 20–50 |
| PbO | 10–65 |
| BaO Group | 0–45 |
| ZnO | 0–10 |
| CdO | 0–20 |
| $Bi_2O_3$ | 0–5 |
| PbO+ZnO+BaO Group | 35–80 |
| CdO+ZnO+BaO Group | 5–45 |
| PbO+CdO+$Bi_2O_3$ | 10–70 | said "BaO Group" signifying metal oxides of the class consisting of BaO, SrO, CaO and MgO.

5. An element according to claim 4 wherein the glass contains at least one oxide selected from the group consisting of $B_2O_3$, $SiO_2$, $P_2O_5$ and $GeO_2$, the total amount of these oxides not exceeding 10% by weight.

6. As a new article of manufacture, a transparent glass element having a thickness not exceeding two millimeters, formed from glass characterized by having a refractive index of at least 2.15 and substantially entirely consisting of 25 to 45% $TiO_2$, 15 to 55% PbO, 5 to 35% BaO, 1 to 8% ZnO, and at least one oxide selected from the group consisting of $B_2O_3$, $SiO_2$, $P_2O_5$ and $GeO_2$, the total amount thereof being 1 to 6%, and the total amount of PbO, BaO and ZnO being at least 50%, by weight.

References Cited in the file of this patent

UNITED STATES PATENTS 2,220,765    Hirose et al. _____ Nov. 5, 1940